(12) United States Patent
Leal

(10) Patent No.: US 12,534,198 B2
(45) Date of Patent: Jan. 27, 2026

(54) APPARATUS AND METHOD FOR INSTALLING EQUIPMENT AT A REMOTE LOCATION

(71) Applicant: SMART Envisioning and Research Inc., Waterloo (CA)

(72) Inventor: Carlos Leal, Waterloo (CA)

( * ) Notice: Subject to any disclaimer, the term of this patent is extended or adjusted under 35 U.S.C. 154(b) by 498 days.

(21) Appl. No.: 17/970,847

(22) Filed: Oct. 21, 2022

(65) Prior Publication Data
US 2024/0132208 A1 Apr. 25, 2024
US 2024/0228032 A9 Jul. 11, 2024

(51) Int. Cl.
*B64C 39/02* (2023.01)
*B25J 15/00* (2006.01)

(52) U.S. Cl.
CPC ......... *B64C 39/024* (2013.01); *B25J 15/0028* (2013.01)

(58) Field of Classification Search
CPC ............... B25J 15/0028; B25J 15/0033; B25J 15/0038; B25J 15/0042; B25J 15/0213; B25J 15/026; B25J 15/0408; B25J 15/045; B25J 15/0491; B64C 39/024
See application file for complete search history.

(56) References Cited

U.S. PATENT DOCUMENTS

| | | | |
|---|---|---|---|
| 8,251,307 B2 | 8/2012 | Goossen | |
| 8,944,373 B2 | 2/2015 | Dickson et al. | |
| 9,738,380 B2 | 8/2017 | Claridge et al. | |
| 9,764,838 B2 | 9/2017 | Priest | |
| 11,130,572 B2 | 9/2021 | Ciesielczyk et al. | |
| 2009/0044655 A1* | 2/2009 | DeLouis | B25J 17/00 403/24 |
| 2016/0023761 A1* | 1/2016 | McNally | G05D 1/0094 701/3 |
| 2019/0202560 A1* | 7/2019 | Bosworth | B64U 50/19 |
| 2019/0321971 A1* | 10/2019 | Bosworth | B25J 15/0028 |
| 2021/0001496 A1* | 1/2021 | Yen | B25J 15/0206 |
| 2021/0127092 A1 | 4/2021 | Rezvani et al. | |

FOREIGN PATENT DOCUMENTS

CN 113232861 A * 8/2021
FR 3055419 A1 3/2018

* cited by examiner

*Primary Examiner* — Saul Rodriguez
*Assistant Examiner* — Brendan P Tighe

(57) ABSTRACT

Apparatus for installing equipment at a remote location includes a gripper that is releasably coupled to a controller. The gripper includes a first grip member and a second grip member. The second grip member is pivotally joined to the first grip member and moveable between an open position and a closed position. The gripper also includes a gripper coupler secured to the first and second grip members and operable to engage a control coupler of the controller to releasably mount the gripper to the controller. The gripper also includes a transmission assembly with a toothed track mounted to the second grip member and a round gear mounted to the first grip member, the round gear meshed with the toothed track and the transmission assembly positioned to be mechanically engaged by the control coupler whereby the control coupler is operable to mechanically drive the round gear to move the second grip member between the open and closed positions.

15 Claims, 14 Drawing Sheets

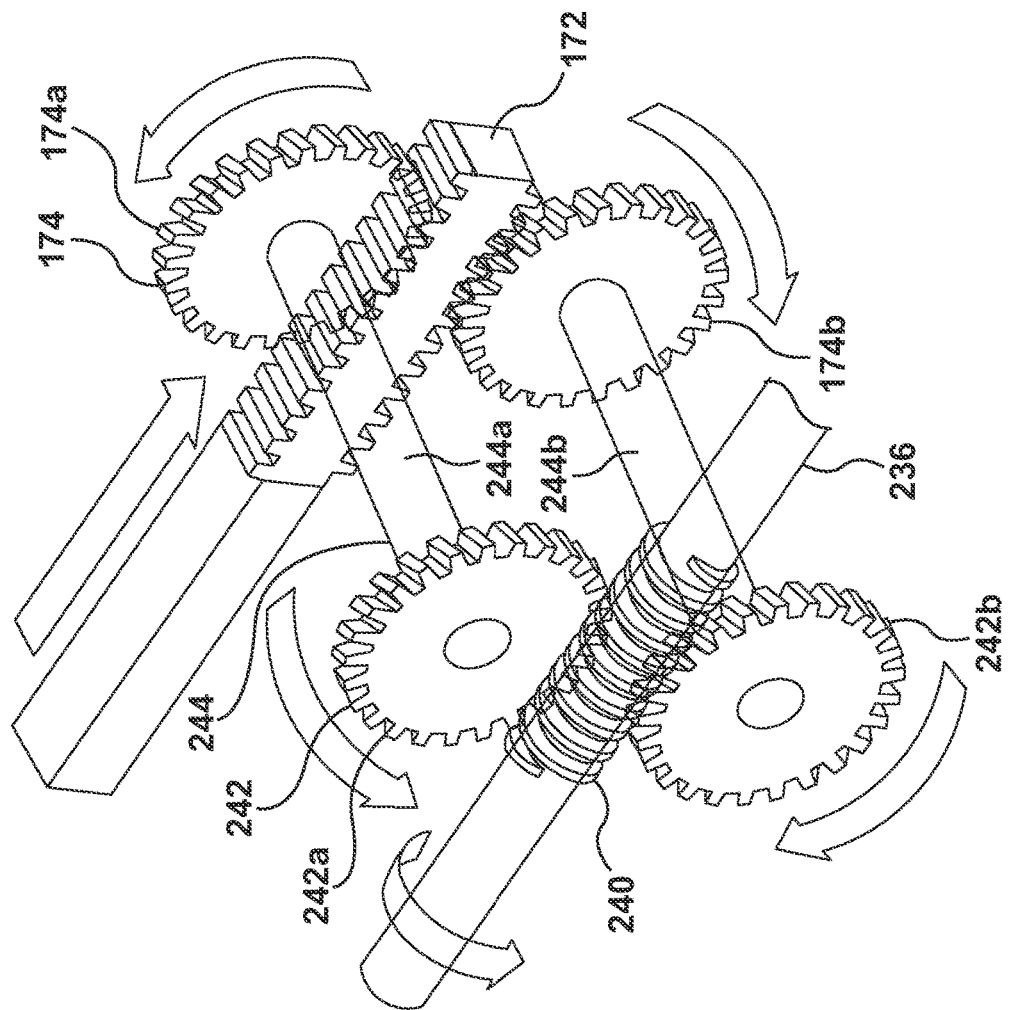
FIG. 8
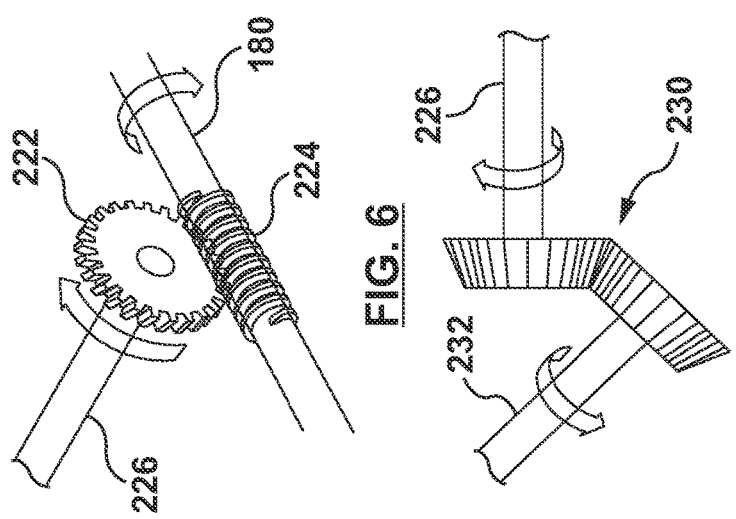
FIG. 6
FIG. 7A
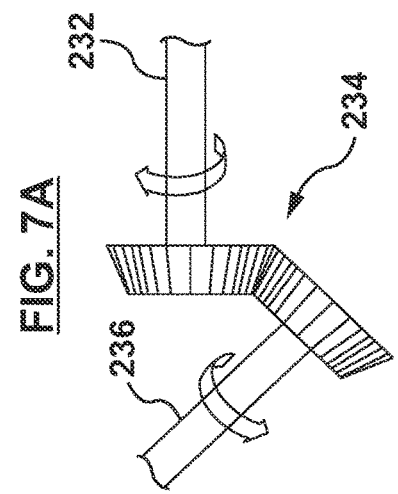
FIG. 7B

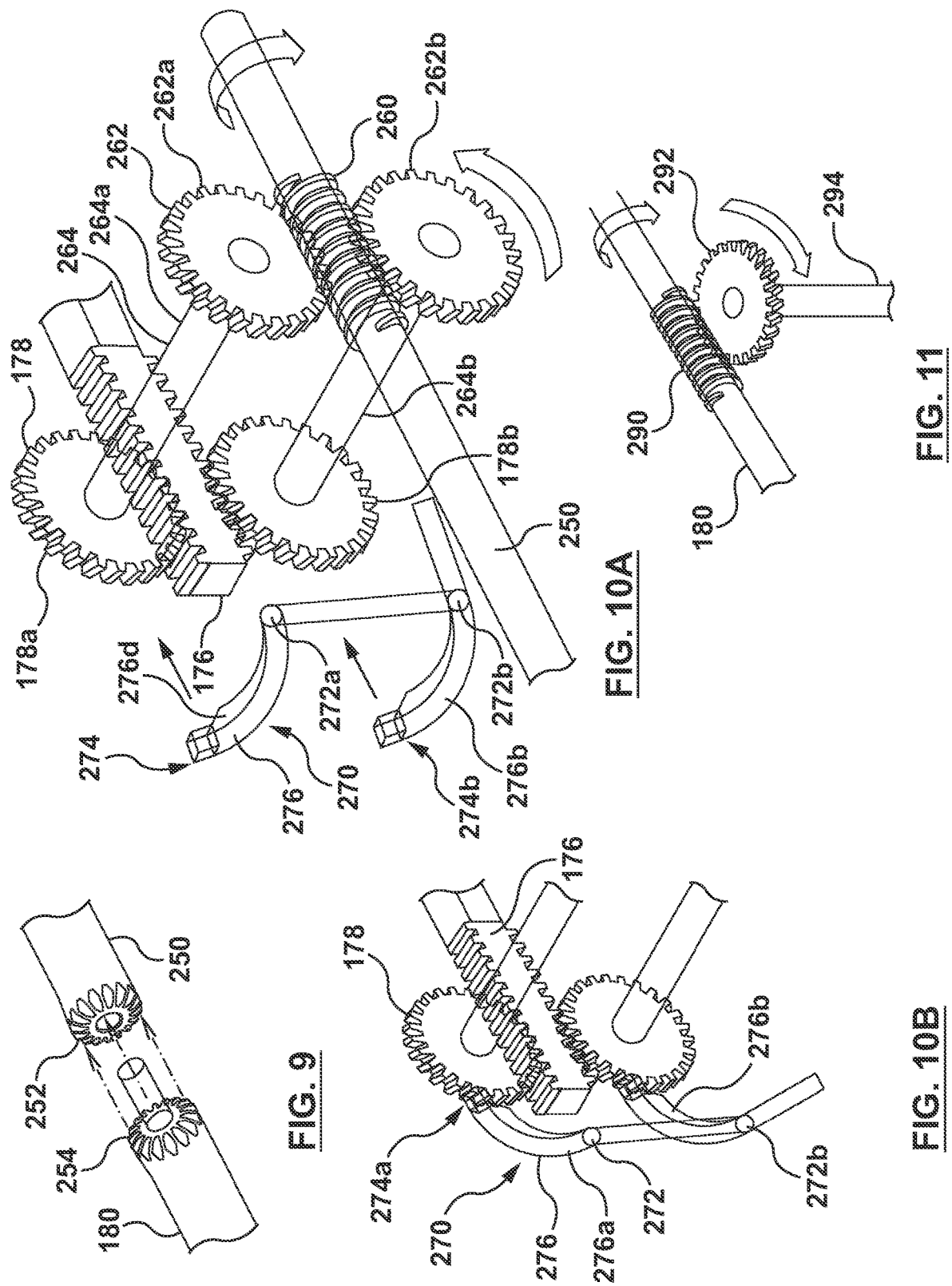

APPARATUS AND METHOD FOR INSTALLING EQUIPMENT AT A REMOTE LOCATION

FIELD

The specification relates generally to apparatus for installing equipment at a remote location, and more specifically to installation apparatus to be carried by unmanned vehicles.

BACKGROUND

Equipment often needs to be installed in a location for a period. For example, a camera may be needed in a location to monitor over a period of time. In some cases, the equipment is secured in the location, such as secured to a utility pole or other convenient structure. The equipment may be electrically coupled to another component, such as an electrical cabinet mounted to or near the utility pole.

In some cases, the location the equipment is to be mounted may be a remote location, difficult or inconvenient to get to. For example, the location may be far from a road and/or raised above the ground. Having a human operator bring the equipment to the location and secure it in place is expensive, risky for the operator, and/or time consuming.

Accordingly, there remains a need for an improved apparatus and method for use in securing equipment in a desired location.

SUMMARY

The following summary is intended to introduce the reader to various aspects of the applicant's teaching, but not to define any invention.

According to an aspect, there is provided an apparatus for installing an object at a remote location, comprising: a controller configured to be mounted to an unmanned vehicle, the controller comprising a controller housing, at least one motor located in the controller housing, a communication module located in the controller housing for receiving user commands for operating the at least one motor, and a control coupler extending from the controller housing, the control coupler including a coupler housing, a drive shaft located within the coupler housing and a fastener located within the coupler housing adjacent the drive shaft, the at least one motor being operable to rotate the drive shaft about a longitudinal drive shaft axis and operable to actuate the fastener; and a gripper configured to be releasably coupled to the control coupler, the gripper comprising a first socket for receiving the drive shaft, a second socket for receiving the fastener to secure the gripper to the control coupler, and a transmission assembly positioned to be engaged by the drive shaft when the drive shaft is received in the first socket, the transmission assembly operable to be powered by a rotation of the drive shaft about the longitudinal axis of the drive shaft to move the gripper from an open configuration to a closed configuration, and a holder for holding the object.

In some examples, the unmanned vehicle is an unmanned aerial vehicle.

The gripper may include: a first grip member having a first end and a second end spaced from the first end; a second grip member having a first end and a second end spaced from the first end, the second grip member pivotally joined to the first grip member at a pivot joint and moveable about the pivot joint between an open position and a closed position, a spacing between the second ends being smaller in the closed position than in the open position; and the transmission assembly including a toothed track mounted to the second grip member spaced from the second end of the second grip member, and a round gear mounted to the first grip member spaced from the second end of the first grip member, the round gear meshed with the toothed track whereby the drive assembly of the drive apparatus is operable to mechanically drive the round gear and thereby move the toothed track to move the second grip member between the open and closed positions.

The transmission assembly may further include a free end toothed track mounted to the second end of the second grip member and a free end round gear mounted to the second end of the first grip member, wherein the free end toothed track and the free end round gear are disengaged when the second grip member is in the open position, engaged when the second grip member is at an intermediate position between the open position and the closed position, and engaged when the second grip member is in the closed position, whereby the drive assembly of the drive apparatus is operable to turn the free end round gear and thereby move the free end toothed track to move the second grip member between the intermediate and closed positions.

The transmission assembly may further include a lock engageable with the free end round gear to prevent the second grip member from moving towards the open position, wherein the lock is biased into an engaged position and is disengaged when the drive assembly is engaged with the transmission assembly.

The fastener may be a threaded fastener and the second socket is a threaded socket, and the at least one motor is operable to rotate the threaded fastener about a longitudinal fastener axis.

According to some aspects, there is provided a gripper to be carried by a controller, the gripper comprising: a first grip member having a first end and a second end spaced from the first end; a second grip member having a first end and a second end spaced from the first end, the second grip member pivotally joined to the first grip member at a pivot joint and moveable about the pivot joint between an open position and a closed position, a spacing between the second ends being smaller in the closed position than in the open position; a gripper coupler secured to the first and second grip members and operable to engage a control coupler of the controller to releasably mount the gripper to the controller; and a transmission assembly, the transmission assembly including a toothed track mounted to the second grip member spaced from the second end of the second grip member, and a round gear mounted to the first grip member spaced from the second end of the first grip member, the round gear meshed with the toothed track and the transmission assembly positioned to be mechanically engaged by the control coupler when the gripper coupler is engaged with the control coupler whereby the control coupler is operable to mechanically drive the round gear and thereby move the toothed track to move the second grip member between the open and closed positions.

The gripper may further comprise a mounting bracket to support a payload, the mounting bracket secured to the first and second grip members.

The toothed track may be an arcuate rack.

The transmission assembly may further include a free end toothed track mounted to the second end of the second grip member and a free end round gear mounted to the second end of the first grip member, wherein the free end toothed track and the free end round gear are disengaged when the second grip member is in the open position, engaged when the second grip member is at an intermediate position between the open position and the closed position, and engaged when the second grip member is in the closed position, and wherein the free end round gear is mechanically coupled to the control coupler when the gripper coupler is engaged with the control coupler whereby the control coupler is operable to turn the free end round gear and thereby move the free end toothed track to move the second grip member between the intermediate and closed positions.

Each of toothed tracks may be an arcuate rack.

The transmission assembly may further include a lock engageable with the free end round gear to prevent the second grip member from moving towards the open position, wherein the lock is biased into an engaged position and is disengaged by the control coupler when the gripper coupler is engaged with the control coupler.

The gripper coupler may include a socket to receive a drive shaft of the control coupler, the drive shaft rotatable about a longitudinal axis of the drive shaft to mechanically move the transmission assembly.

The gripper coupler may also include a threaded opening for receiving a threaded fastener of the control coupler to secure the gripper to the controller.

According to an aspect, there is provided a gripper moveable between an open configuration and a closed configuration, the gripper including: a gripper coupler operable to engage a control coupler of a controller to mount the gripper to the controller with a drive shaft of the control coupler received in a first socket of the gripper coupler; and a transmission assembly positioned to be engaged by the drive shaft when the drive shaft is received in the first socket, the transmission assembly operable to be powered by a rotation of the drive shaft about a longitudinal axis of the drive shaft to move the gripper from the open configuration to the closed configuration.

The transmission assembly may include a lock engageable to prevent the gripper from moving from the closed configuration to the open configuration, wherein the lock is biased into an engaged position and is disengaged by the control coupler when the gripper coupler is engaged with the control coupler.

The lock may be disengaged by the drive shaft when the drive shaft is received in the first socket.

According to some aspects, there is provided a method of operating a gripper, comprising: remotely operating an unmanned vehicle to navigate the robotic vehicle to a pole, the unmanned vehicle carrying a controller to which the gripper is removably mounted; remotely operating the unmanned vehicle to position the gripper with the pole received between first and second grip members of the gripper; remotely operating the controller to mechanically engage a transmission assembly of the gripper and mechanically operate the transmission assembly to close the first and second grip members around the pole; remotely operating the controller to dismount the gripper from the controller, whereby dismounting includes withdrawing a drive shaft of the controller from the gripper thereby engaging a lock of the gripper to lock the first and second grip members in position around the pole to secure the gripper to the pole; and remotely operating the unmanned vehicle to navigate the unmanned vehicle away from the gripper with the controller secured to the vehicle.

The method may further comprise: remotely operating the unmanned vehicle to return to the gripper; and remotely operating the controller to remount the gripper to the controller, whereby remounting includes inserting the drive shaft of the controller into the gripper and thereby disengaging the lock.

The method may further comprise: remotely operating the controller to mechanically engage a transmission assembly of the gripper and mechanically operate the transmission assembly to open the first and second grip member from around the pole; and remotely operating the unmanned vehicle to navigate the unmanned vehicle away from the pole with the gripper mounted to the drive apparatus and the controller secured to the vehicle.

BRIEF DESCRIPTION OF THE DRAWINGS

The drawings included herewith are for illustrating various examples of articles, methods, and apparatuses of the present specification and are not intended to limit the scope of what is taught in any way. In the drawings:

FIG. 6 is a schematic view of a first gear interface of the installation apparatus of FIG. 1B;

FIG. 7A is a schematic view of a second gear interface of the installation apparatus of FIG. 1B;

FIG. 7B is a schematic view of a third gear interface of the installation apparatus of FIG. 1B;

FIG. 8 is a schematic view of a fourth gear interface of the installation apparatus of FIG. 1B;

FIG. 9 is a schematic view of a fifth gear interface of the installation apparatus of FIG. 1B;

FIG. 10A is a schematic view of a sixth gear interface of the installation apparatus of FIG. 1B with a lock disengaged;

FIG. 10B is a schematic view of the sixth gear interface of the installation apparatus of FIG. 1B with the lock engaged;

FIG. 11 is a schematic view of a seventh gear interface of the installation apparatus of FIG. 1B;

DETAILED DESCRIPTION

Various apparatuses or processes will be described below to provide an example of an embodiment of each claimed invention. No embodiment described below limits any claimed invention and any claimed invention may cover processes or apparatuses that differ from those described below. The claimed inventions are not limited to apparatuses or processes having all of the features of any one apparatus or process described below or to features common to multiple or all of the apparatuses described below. It is possible that an apparatus or process described below is not an embodiment of any claimed invention. Any invention disclosed in an apparatus or process described below that is not claimed in this document may be the subject matter of another protective instrument, for example, a continuing patent application, and the applicants, inventors or owners do not intend to abandon, disclaim, or dedicate to the public any such invention by its disclosure in this document.

Figure 1A:
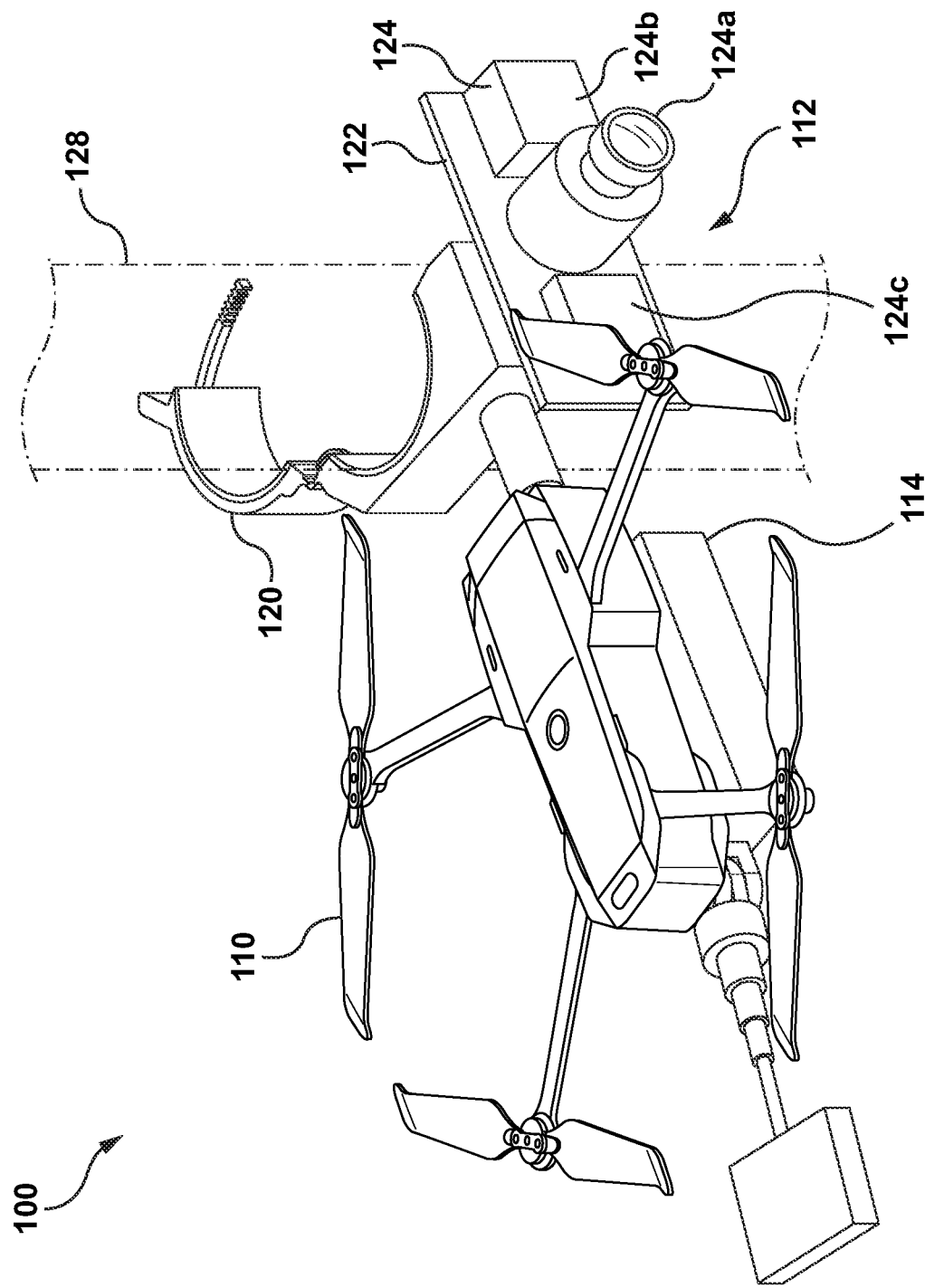
FIG. 1A is a top perspective view of a first installation apparatus, according to an embodiment, mounted to an unmanned vehicle.

Referring to FIG. 1A, illustrated at 100 is an exemplary installation apparatus 112 mounted to a vehicle 110. The installation apparatus 112 includes a controller 114 and a gripper 120 releasably coupled to the controller 114.

It will be appreciated that the controller may be mounted to the vehicle 110 in any suitable way. In some embodiments, the controller is rigidly secured to the vehicle 110 such that they move as one body. In some embodiments, the controller 114 is secured to the vehicle 110 by releasable fasteners, e.g., screws, magnets, or clips.

As described further below, the controller 114 is operable to close the gripper 120 (e.g., around an environmental object to clamp the object) and is operable to release the gripper 120 from the controller 114 such that the vehicle 110 carrying the controller 114 can then be maneuvered away from the gripper 120. The vehicle 110 and controller 114 are remote-controlled apparatus, operable from a remote location to allow an operator to deploy the gripper 120 from the remote location. As illustrated, the controller 114 may include a controller housing 114a. The controller housing 114a is mounted to the vehicle 110. At least one motor and a communication module are located in the controller housing 114a.

The exemplary vehicle 110 is an unmanned vehicle. The vehicle 110 may be, e.g., an aerial vehicle (e.g., including a plurality of rotors, as illustrated), an aquatic vehicle (e.g., including a propeller), and/or a land-based vehicle (e.g., including wheels). As illustrated, the controller housing 114a may be mounted to the underside of an unmanned aerial vehicle.

In use, the gripper 120 is carried to a desired location by the unmanned vehicle 110 and left in place in the desired location by the unmanned vehicle 110 and controller 114. The unmanned vehicle 110 and controller 114 can be used repeatedly to install multiple grippers, each at a different location. The exemplary gripper 120 includes a mounting bracket 122. The mounting bracket 122 can be used to carry one or more devices. The bracket 122 may be a universal mounting bracket. In some embodiments, a payload object 124 is mounted to the gripper 120 to be left in the desired location with the gripper 120. The gripper 120 can be used to hold the object 124 in the desired location. In some embodiments, the payload object 124 is a sensor, such as a camera. In some embodiments, as exemplified, multiple objects are mounted to the gripper 120. As exemplified, a camera 124a, a battery 124b, and a thermal sensor 124c are each mounted to the gripper 120 via the mounting bracket 122.

The gripper 120 is moveable between open and closed configurations. The gripper 120 can close around an environmental object to grip the object (e.g., to clamp the object between grip members of the gripper). For example, the gripper 120 can close around a pole 128, such as a telephone pole or a fence post, to grip the pole 128. The pole 128 is an elongated, rigid member. The pole 128 may have a generally consistent cross-sectional shape, which may be round or including one or more planar surface (e.g., square, rectangular, octagonal, hexagonal, or pentagonal). When the gripper 120 is closed around the environmental object, the payload object 124 is held to the environmental object. In some embodiments, the gripper 120 is designed as a low-cost device. In some embodiments, the movement between the open and closed configurations is mechanically powered by the controller 114. The gripper 120 may be provided without including a motor or engine, whereby opening and closing of the gripper 120 is powered by one or more motors of the controller 114. It will be appreciated that the gripper 120 and/or the controller 114 may be provided without the unmanned vehicle 110 in some embodiments.

Figure 1B:
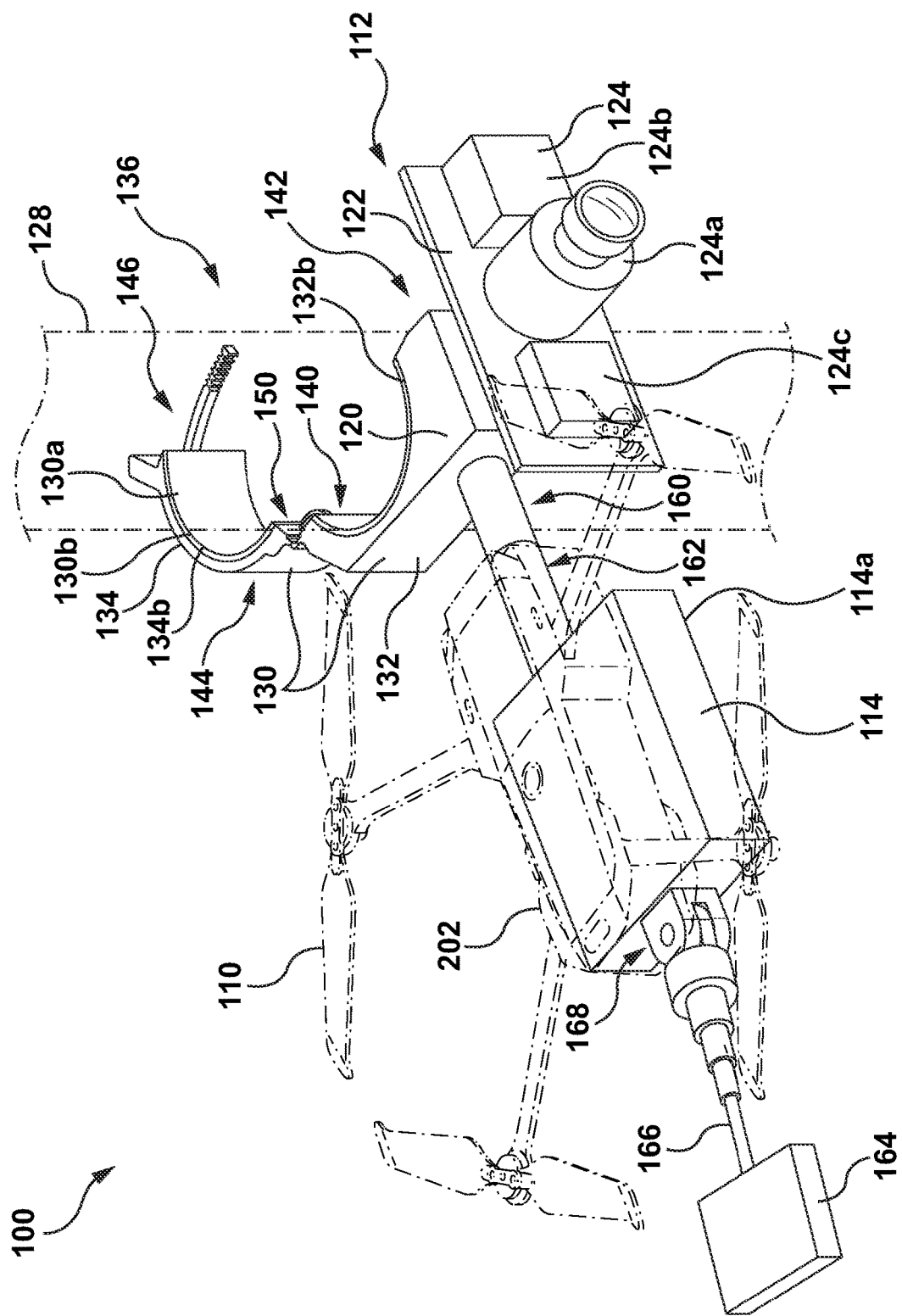
FIG. 1B is a top perspective view of the installation apparatus of FIG. 1A, with the unmanned vehicle shown in dashed lines.
Figure 2A:
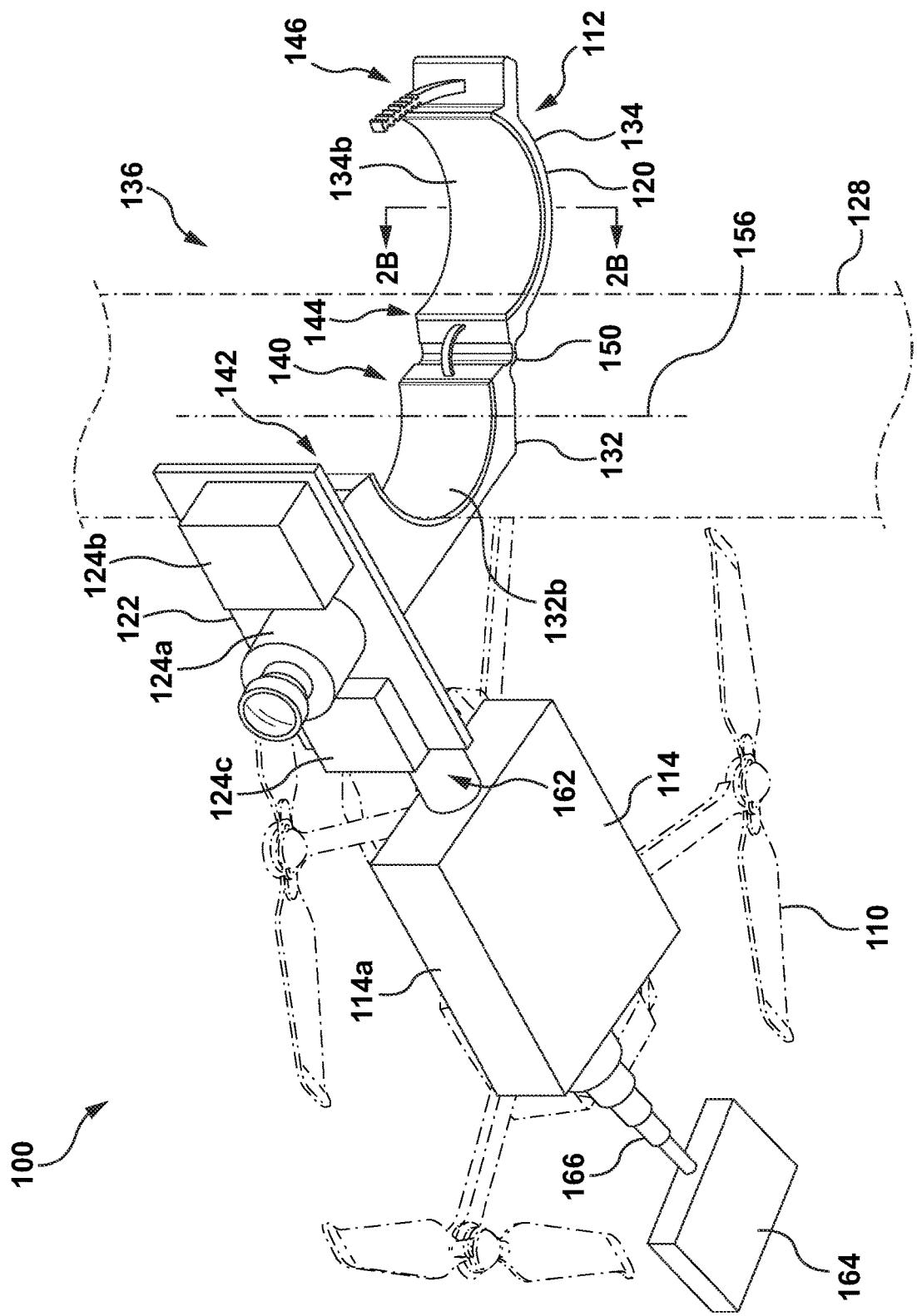
FIG. 2A is a bottom perspective view of the installation apparatus of FIG. 1B.

Referring to FIGS. 1B and 2A, the gripper 120 includes a plurality of grip members 130. The mounting bracket 122 is secured to the grip members 130. In the exemplary embodiment, the gripper 120 includes a first grip member 132 and a second grip member 134. It will be appreciated that the gripper 120 may include more than two grip members 130 in some embodiments. The grip members 130 are secured together (e.g., at a hinge or pivot joint) and operable to be closed around an object when the gripper 120 is in the closed configuration (e.g., FIG. 3D). In some embodiments, the grip members 130 are arranged to close towards and/or around a grip axis 156 (e.g., a longitudinal axis of a pole or other environmental object). As exemplified, the grip members 130 are operable to close around a pole 128 to grip the pole 128 between the grip members 130. In the open configuration, the gripper 120 is arranged with an open passage 136 between the grip members 130 through which the pole 128 may pass to be received between the grip members 130.

Figure 3A:
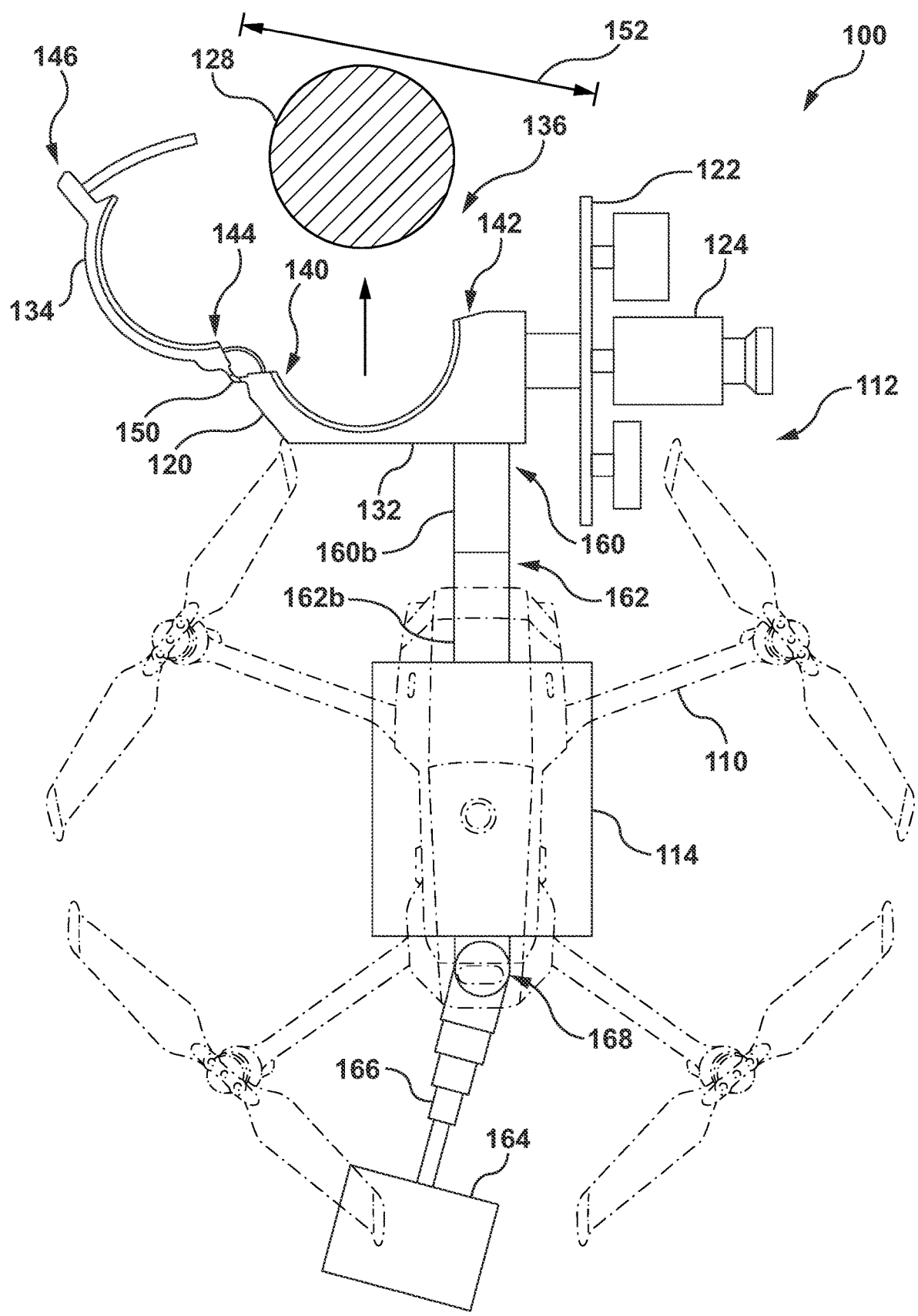
FIG. 3A is a top view of the installation apparatus of FIG. 1B with a gripper in an open configuration.
Figure 3B:
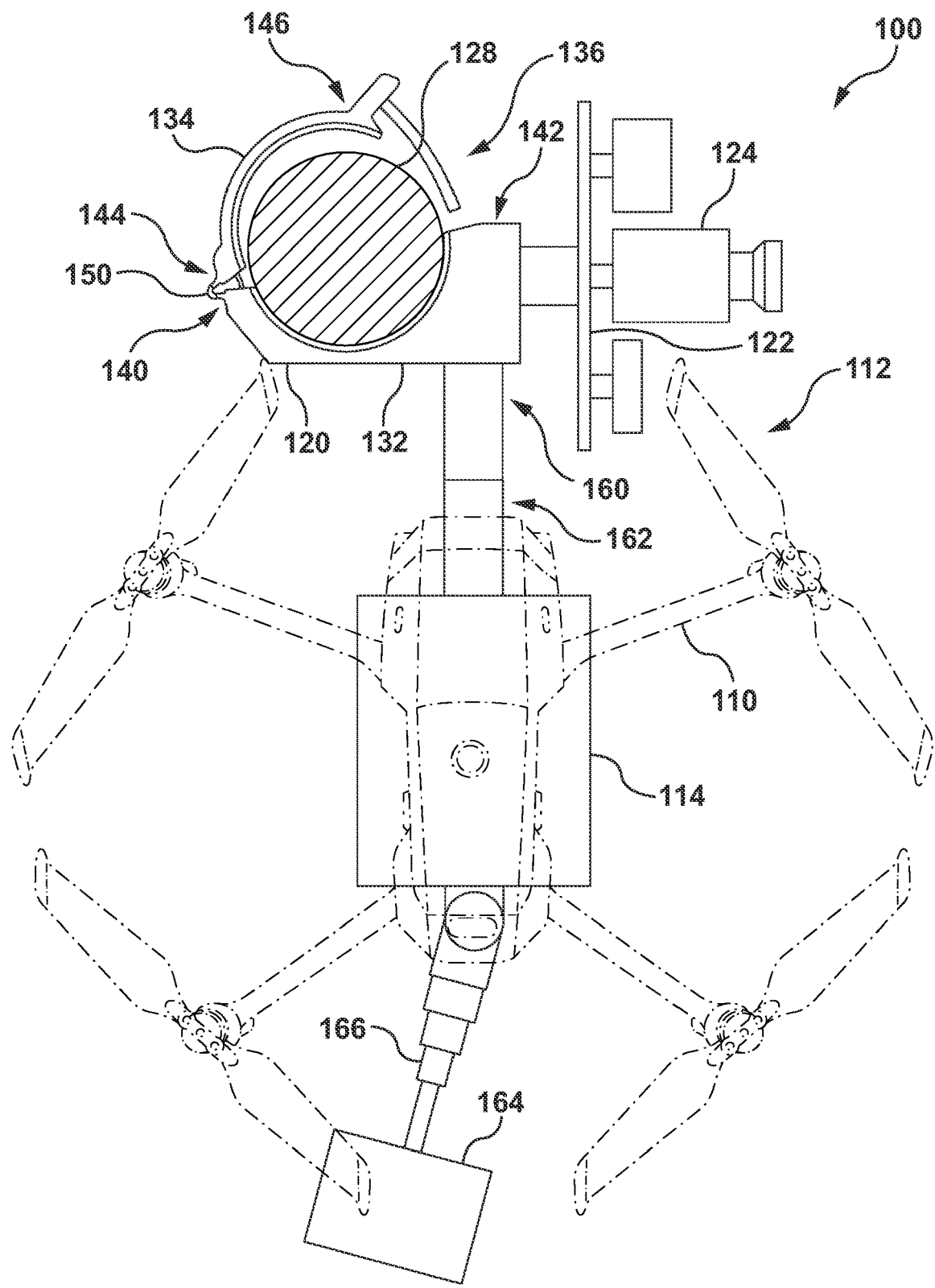
FIG. 3B is a top view of the installation apparatus of FIG. 1B with the gripper in a partially open configuration.
Figure 3C:
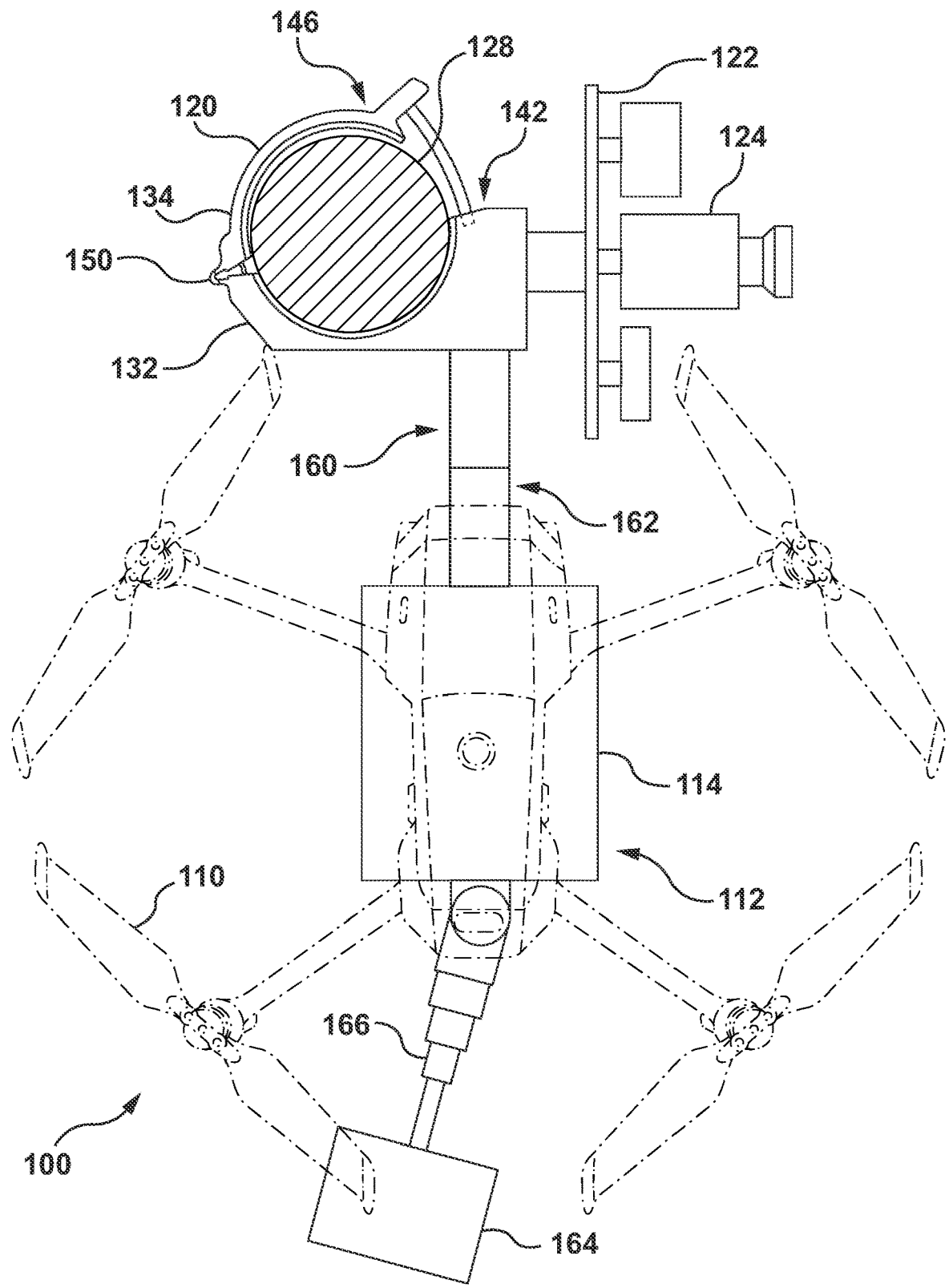
FIG. 3C is a top view of the installation apparatus of FIG. 1B with the gripper in an intermediate configuration.
Figure 3D:
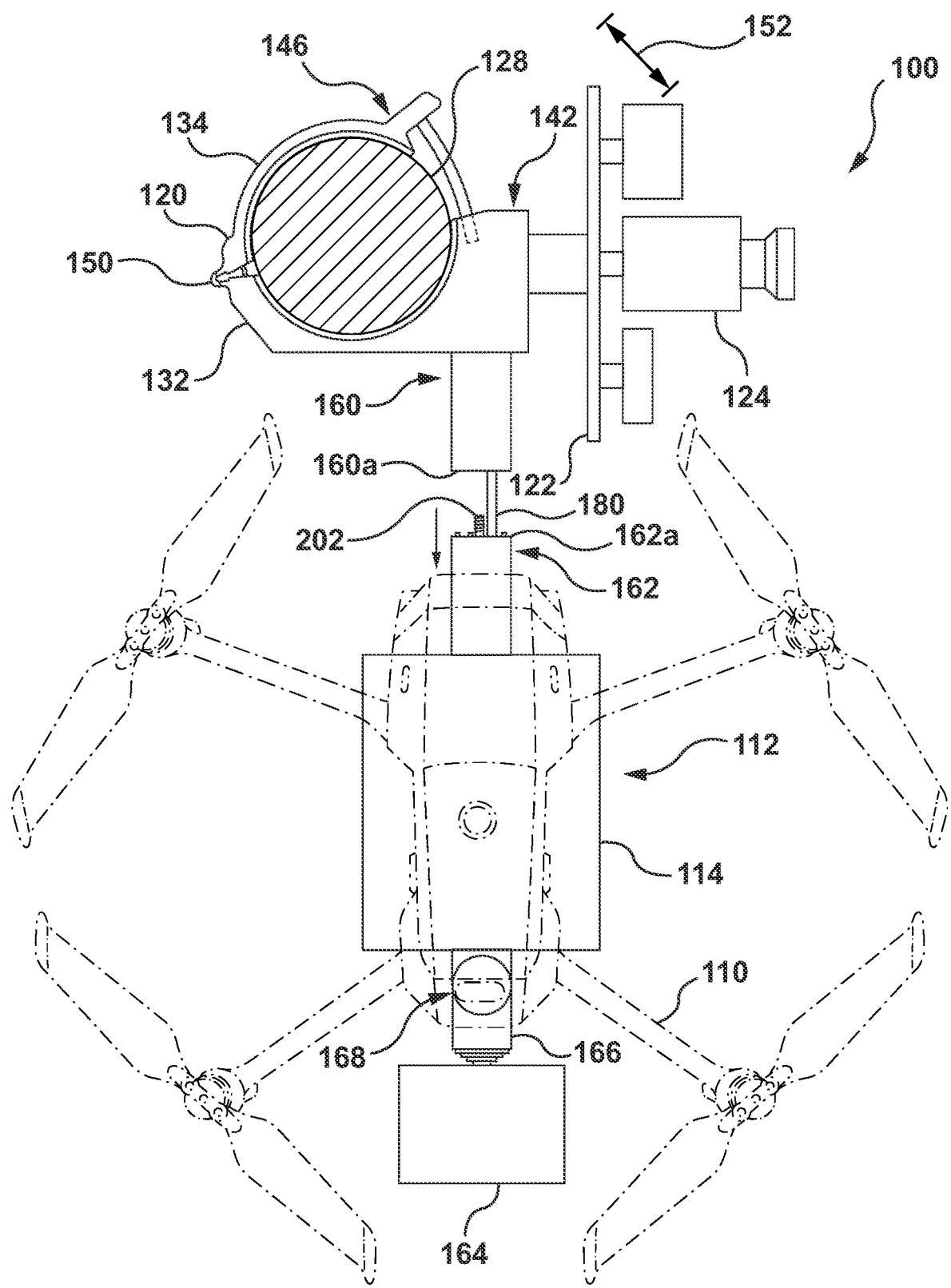
FIG. 3D is a top view of the installation apparatus of FIG. 1B with the gripper in a closed configuration and the vehicle partially withdrawn from the gripper.

The first grip member 132 has a first end 140 and a second end 142 spaced from the first end 140. The second grip member 134 has a first end 144 and a second end 146 spaced from the first end 144. The first and second grip members 132, 134 are pivotally joined at a pivot joint 150. The second pivot member 134 is moveable about the pivot joint 150 between an open position (e.g., as illustrated in FIG. 3A) and a closed position (e.g., as illustrated in FIG. 3D), with a spacing 152 (FIGS. 3A and 3D) between the second ends 142, 146 being smaller when the second member 134 is in the closed position than when the second grip member 134 is in the open position. In some embodiments, as exemplified, the open passage 136 is formed between the second ends 142, 146 when the second grip member 134 is in the open position.

The exemplary grip members 132, 134 are shaped to hold an environmental object in an encompassing grip (e.g., pole 128). The environmental object is held between gripping faces 130a of the grip members 130. In some embodiments, the grip members 130 each include a removable cover 130b forming a gripping face 130a of the grip member. For example, grip members 132, 134 each include a respective gripper cover 132b, 134b. The covers 132b, 134b may include a rubberized or otherwise high-friction surface directed inwardly to a space between the grip members 132, 134.

The cover 130b may be removeable to facilitate changing covers, e.g., to replace worn out covers or to use differently-shaped covers for different applications. The cover 130b may be removably fastened to the grip member, e.g., via hook and loop fasteners, threaded fasteners, or adhesive.

Figure 2C:
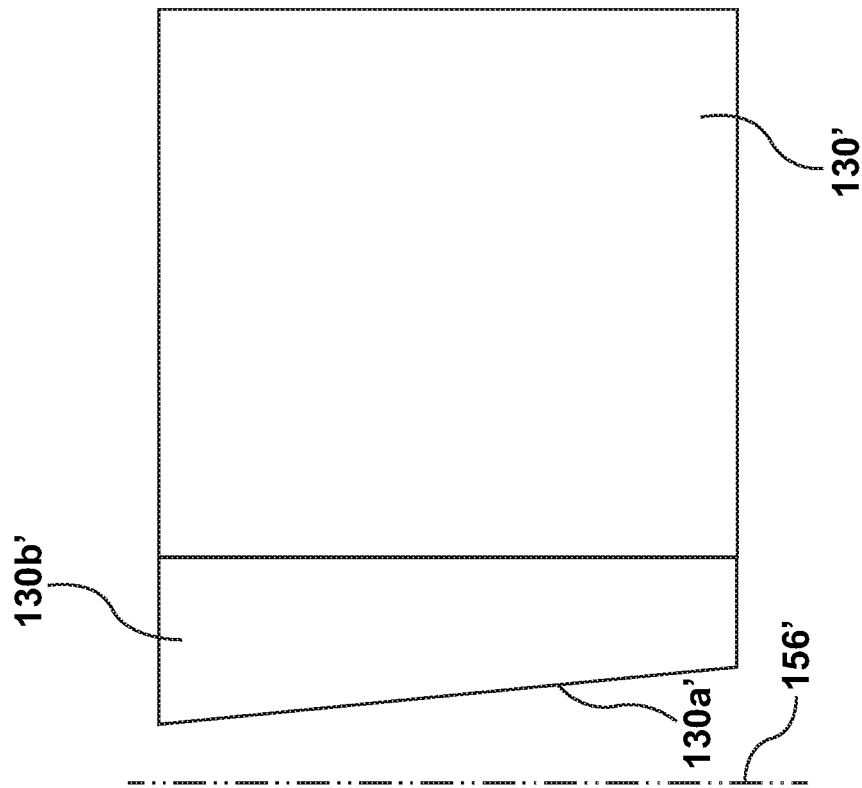
FIG. 2C is a cross sectional view corresponding to the view of FIG. 2B, of a second installation apparatus, according to an embodiment.
Figure 2B:
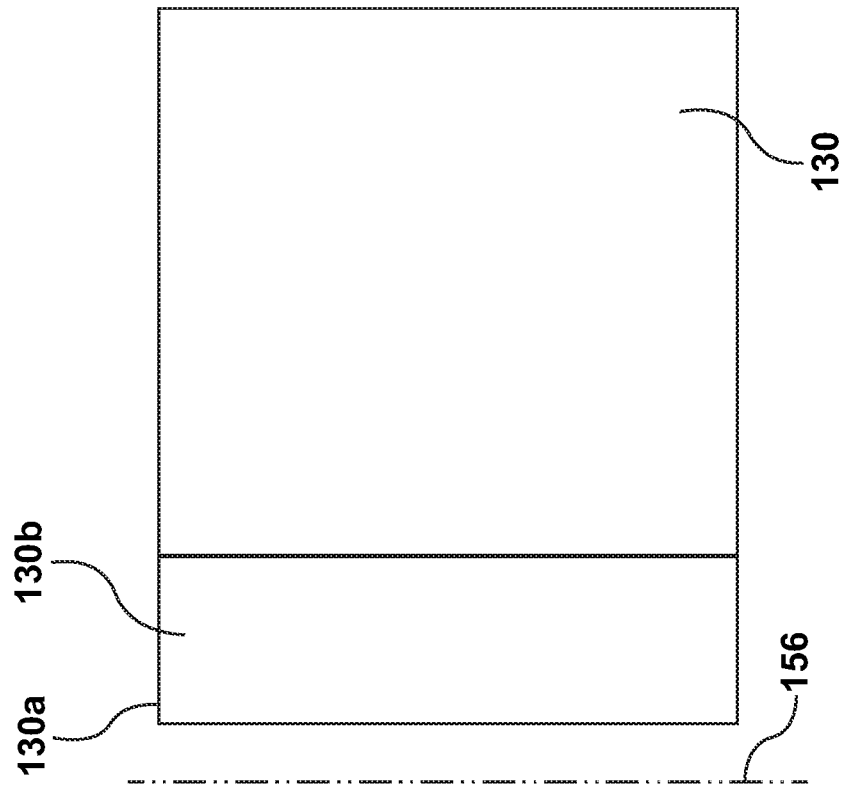
FIG. 2B is a cross sectional view of FIG. 2A, taken along line 2B-2B of FIG. 2A.

Referring now to FIGS. 2B and 2C, it will be appreciated that the shape of the gripping face 130a may be any suitable shape. In some embodiments, as exemplified in FIG. 2B the gripping face 130a extends generally parallel to the grip axis 156. FIG. 2B illustrates a cross sectional view of the gripper 130 and cover 130b of FIG. 2A, taken along line 2B-2B of FIG. 2A. In some embodiments, as exemplified in the alternative embodiment of FIG. 2C, a gripping face 130a' is sloped relative to the grip axis 156. The gripping face 130a' may have a first (e.g., upper) end that is close to the grip axis 156 than an opposite second (e.g., lower) end when the gripper 120 is closed about the grip axis 156.

In some embodiments, the shape or arrangement of the face 130a is due to the shape of the cover 130b. It will be appreciated that the shape of cover 130b may be any suitable shape. As exemplified in FIG. 2B, in some embodiments, the cover 130b has a generally constant width along an axial direction parallel to the grip axis 156. When used with a gripper member presenting a generally parallel surface, the cover 130b with a generally constant width also provides a generally parallel gripping face 130a relative to the grip axis 156. However, as exampled in FIG. 2C, in some embodiments, a cover 130b' is a tapered cover, secured to a gripper member 130'. A tapered cover may be used with a tapered environmental object (e.g., a tapered pole). The tapered cover tapers along an axial direction parallel to the grip axis 156', to present a sloped gripping face 130a'.

It will be appreciated that the environmental object may extend vertically, or may extend horizontally or at any other angle to vertical. The gripper 120 may be used to grip environmental objects having a round cross-sectional shape. However, it will be appreciated that the gripper 120 may also or alternatively be used to grip environmental objects having a non-round cross-sectional shape, such as objects having a square, rectangular, octagonal, hexagonal, or pentagonal cross-sectional shape about which the gripper 120 is closed. It will be understood that the gripping faces 130a may be used against similarly-shaped surfaces of environmental objects, or may be used against non-matching surfaces of environmental objects. In some embodiments, using the gripper 120 with the gripping faces 130a contacting similarly-shaped surfaces of environmental objects provides for a better grip on the environmental object.

The exemplary grip members 130 have gripping faces 130a having a cylindrical concave shape with a continuous curvature. In some embodiments, a cylindrical concave shape is advantageous for use with cylindrical environmental objects such as telephone poles and fence posts. However, it will be appreciated that the grip members 130 may have alternative shapes. For example, a gripper 120 may include grip members 130 with gripping faces 130a having a saddle shape. Or a gripper 120 may include grip members 130 having planar gripping faces 130a, such as a grip member 130 having a single planar gripping face 130a or a grip member 130 having a gripping face 130a formed of two or more planar portions meeting at angled corners.

As exemplified in FIG. 3A, the gripper 120 also includes a gripper coupler 160. The controller 114 includes a control coupler 162. The gripper coupler 160 and the control coupler 162 are releasably engageable with one another.

The gripper coupler 160 is secured to the grip members 130. The gripper coupler 160 may include a gripper coupler housing 160b. The control coupler 162 may include a control coupler housing 162b. Although it will be appreciated that the gripper coupler 160 may be provided at the grip members 130 and the control coupler 162 may be provided at the control housing 114a, in some embodiments one or both extends outward. Extending the coupler outward may facilitate engaging the coupler with another coupler. As exemplified, the coupler housing 162b may extend out from the controller housing 114a. As exemplified, the coupler housing 160b extends out from the grip members 130. The coupler housing 160b may be secured to one of the grip members 130 and extend therefrom.

The gripper coupler 160 is operable to engage the control coupler 162 to releasably mount the gripper 120 to the controller 114. In some embodiments, as illustrated in FIG. 3D, the gripper coupler 160 has an outward face 160a that rests against an outward face 162a of the control coupler 162 when the gripper coupler 160 is secured to control coupler 162. One or both of the faces 160a, 162a may include a weather proof seal. The weatherproof seal prevents moisture from penetrating between the couplers 160, 162 when the gripper coupler 160 is secured to control coupler 162.

Referring again to FIGS. 1B and 2, in some embodiments, the controller 114 includes a counterweight 164. In use, the counterweight 164 counterbalances the weight of the gripper 120 while the gripper 120 is mounted to the controller 114. In some embodiments, the counterweight 164 is repositionable relative to the control coupler 162 to account for changes in weight distribution during use and/or when the gripper 120 is mounted or released. As exemplified, the counterweight 164 is mounted to the controller 114 via an arm 166 pivotable about a pivot joint 168. The arm 166 can be used to swing the counterweight 164. The exemplary arm 166 is also a telescoping arm 166. The controller 114 may include a motor 154 (FIGS. 4 and 5) coupled to the counterweight 164 and/or arm 166 to move the counterweight 164 relative to the control coupler 162. In some embodiments, the motor 154 automatically adjusts the counterweight 164, e.g., in response to an engagement or disengagement of the couplers 160, 162. For example, the motor 154 may extend the arm 166 when the couplers 160, 162 are engaged with one another, and may withdraw the arm 166 when the couplers 160, 162 are disengaged from one another. The counterweight 164 may be and/or include a battery (e.g., a battery coupled to one or more motors of the controller 114 to supply electrical power to the motors).

Referring now to FIGS. 3A to 3D, the gripper 120 is operable to be moved between the open configuration (FIG. 3A) and the closed configuration (FIG. 3C) by the controller 114. As illustrated in FIG. 3D, the controller 114 is operable to disengage from the gripper 120 to leave the gripper 120 in position. For example, once the gripper 120 is installed on, e.g., a pole 128 (FIG. 3D), the controller 114 may disengage from the gripper 120 to leave the gripper 120 in position on the pole 128.

Figure 4:
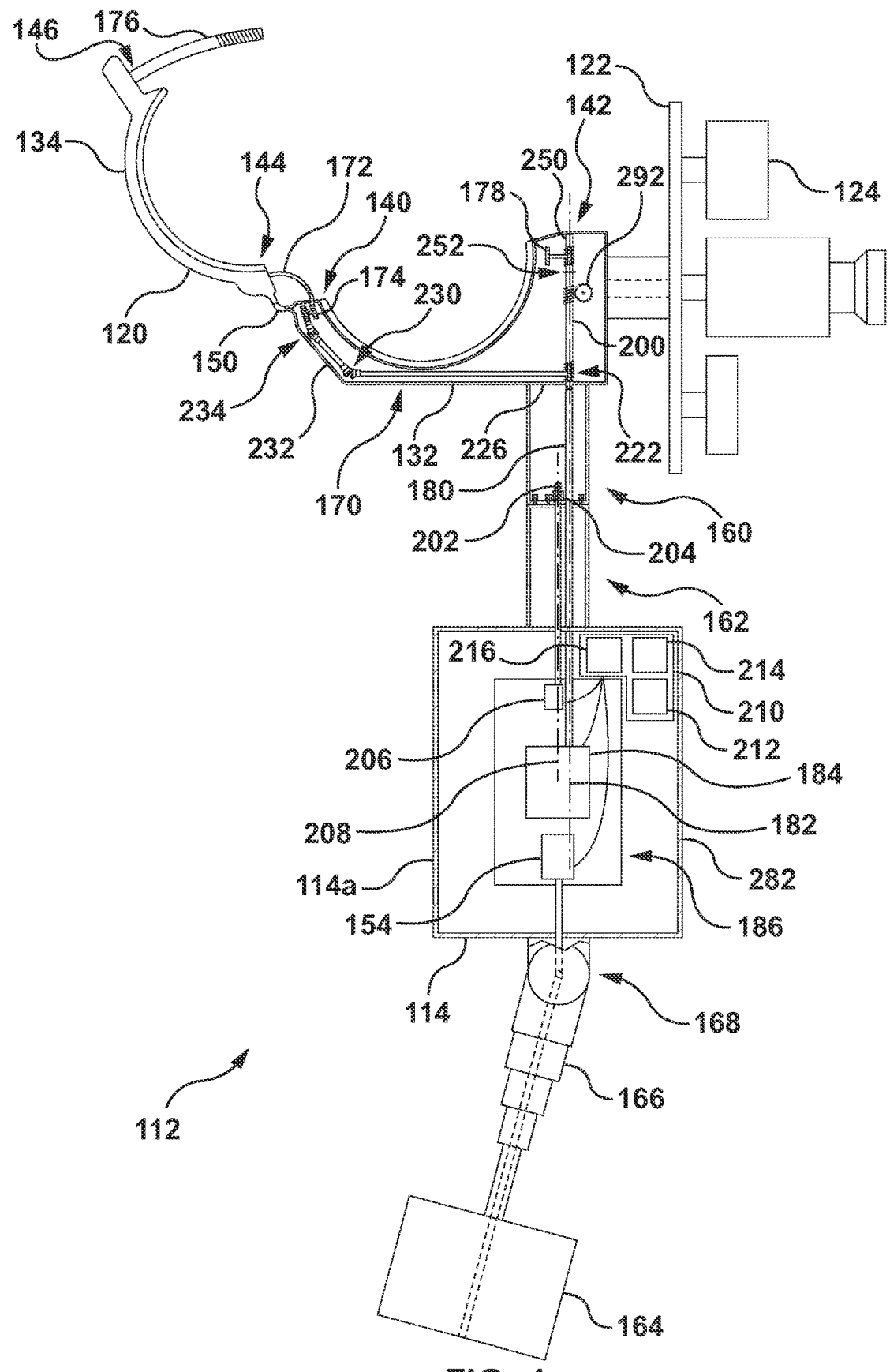
FIG. 4 is a top cut away view of the installation apparatus of FIG. 1B with the gripper in the open configuration.
Figure 5:
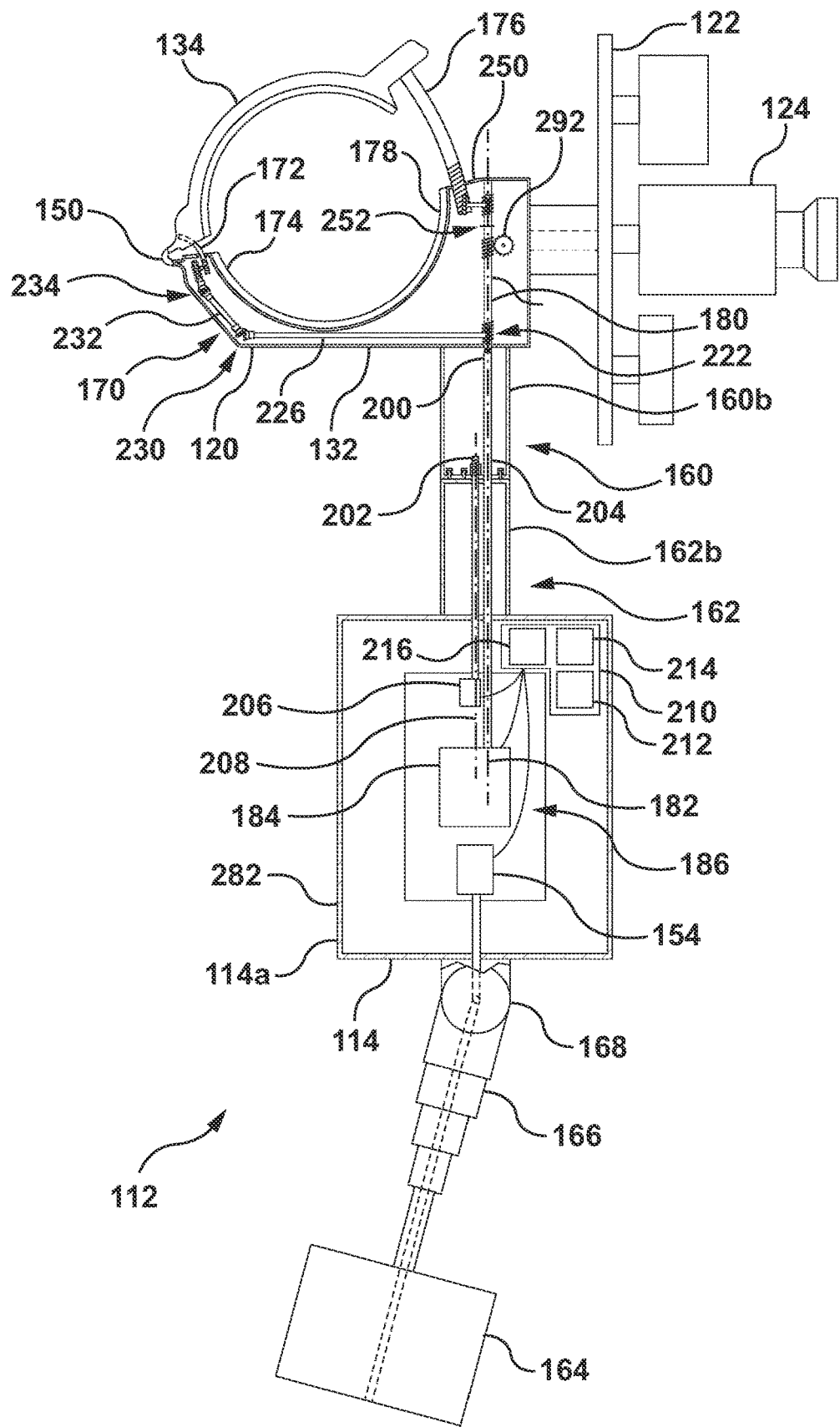
FIG. 5 is a top cut away view of the installation apparatus of FIG. 1B with the gripper in the intermediate configuration.

Referring to FIGS. 4 and 5, the gripper 120 includes a transmission assembly 170. The transmission assembly 170 includes a toothed track 172 (see also FIG. 8) mounted to the second grip member 134 spaced from the second end 146 of the second grip member 134. As exemplified, the toothed track 172 is a rack, and may be an arcuate rack. The transmission assembly 170 also includes a round gear 174 mounted to the first grip member 132 spaced from the second end 142 of the first grip member 132. The exemplary round gear 174 is a pinion engaged with the rack 172. The round gear 174 is meshed with the toothed track 172.

The transmission assembly 170 is positioned to be engaged by the control coupler 162 when the gripper coupler 160 is engaged with the control coupler 162. The transmission assembly 170 is positioned to be mechanically engaged with the control coupler 162 to mechanical receive power from the controller 114 through the control coupler 162. The power received from the controller 114 drives (i.e., turns) the round gear 174 and thereby drives the track 172 to move the second grip member 134 between the open and closed positions.

In some embodiments, the transmission assembly 170 also includes a free end toothed track 176 (see also FIG. 11) mounted to the second end 146 of the second grip member 134 and a free end round gear 178 mounted to the second end 142 of the first grip member 132. As exemplified, the toothed track 176 is a rack, and may be an arcuate rack. The exemplary free end round gear 178 is a pinion meshed with the rack 176. The free end track 176 and the free end pinon 178 are disengaged when the second grip member 134 is in the open position (FIG. 3A), engaged when the second grip member is at an intermediate position (FIG. 3C) between the open position and the closed position, and engaged when the second grip member is in the closed position (FIG. 3D). The transmission assembly 170 is arranged to mechanically provide power from the controller 114 to the free end round gear 178 when the gripper coupler 160 is engaged with the control coupler 162, to drive the free end round gear 178 thereby driving the free end track 176 to move the second grip member 134 between the intermediate and closed positions. In other words, the free end round gear and track may be used to tighten the grip of the gripper 120 on the environmental object (e.g., pole 128).

Referring still to FIGS. 4 and 5, it will be appreciated that there are various ways in which a transmission assembly may receive and carry mechanical movement or power supplied by the controller 114. In some embodiments, as exemplified, the transmission assembly 170 is configured to mechanically receive power from the controller 114 via a rotational movement of an element of the control coupler 162. The exemplary transmission assembly 170 is releasably engaged with a drive shaft 180 of a drive assembly 186 at the control coupler 162. The drive assembly 186 of the controller includes a motor 184 mechanically coupled to the shaft 180, and the shaft 180 is driven rotationally about its longitudinal axis 182 by the motor 184. The drive shaft 180 may be located in the coupler housing 162b, as exemplified. The motor 184 may be located in the controller housing 114a, as exemplified.

In some embodiments, as exemplified, the drive shaft 180 is also a support rod. The support rod extends into the gripper 120 to assist in bearing the weight of the gripper 120. The gripper coupler 160 includes a socket 200 (e.g., in the coupler housing 160b) to receive the shaft 180. The shaft 180 extends into the gripper 120 and is rotatable about its axis 182 to power the transmission assembly 170. The shaft 180 is inserted into the socket 200 when the couplers 160, 162 are joined, and is withdrawn from the socket 200 when the couplers 160, 162 are disengaged.

The exemplary gripper coupler 160 and control coupler 162 also include a releasable fastener 202 to releasably secure the couplers 160, 162 together. As exemplified, the fastener 202 is received in a fastener socket 204, the fastener socket 204 provided in the exemplary gripper coupler 160 (e.g., in the coupler housing 160b) and the fastener 202 provided in the exemplary control coupler 162 (e.g., in the coupler housing 162b). In some embodiments, the fastener 202 is a threaded fastener, and the socket 204 is a threaded socket 204. The controller 114 includes a motor 206 coupled to the fastener 202 to rotate the fastener 202 about a longitudinal axis 208 of the fastener 202. The motor 206 is operable to rotate the fastener 202 to drive the fastener 202 into the socket 204. In some embodiments, the motor 206 is also operable to rotate the fastener 202 to withdraw the fastener from the socket 204. Accordingly, the couplers 160, 162 may be secured together and released from one another.

It will be appreciated that while the controller 114 is illustrated with three motors, in other embodiments the controller 114 may include one or two or more than three motors. For example, one motor may perform the functions of two or more of the illustrated motors, e.g., selectively engaging the necessary transmission components via a clutch. As exemplified, one or more motors are located in the controller housing 114a. In some embodiments, each motor of the installation apparatus 112 are located in the controller housing 114a.

The controller 114 also includes a control system 210. The control system 210 is communicatively coupled to each of the motors of the controller 114 and operable to control the operation of the motors. The control system 210 includes a communication module 212, at least one processor 214, and at least one data storage device 216. The at least one data storage device 216 may store operating instructions for use in controlling the motors of the controller 114 in response to user instructions. The communication module 212 (e.g., a transceiver) is operable to receive user instructions from a remote user (e.g., via a user control device directly operated by the remote user). The communication module 212 is communicatively coupled to the at least one processor 214 and at least one data storage device 216 to provide the user instructions. The communications module 212 may be located in the controller housing 114a, as exemplified.

The at least one processor 214 and at least one data storage device 216 are operable to apply the user instructions to control the motors of the controller 114. For example, the user instruction may be to close the gripper 120, and the controller 114 is operable to respond by operating motor 184 to rotate shaft 180 about its axis in a first direction to power the transmission assembly 170 to close the gripper 120. The user instruction may be to open the gripper 120, and the controller 114 is operable to respond by operating motor 184 to rotate shaft 180 about its axis in a second direction opposite to the first direction to power the transmission assembly 170 to open the gripper 120. The use instruction may be to release the gripper 120, and the controller 114 is operable to respond by operating motor 206 to rotate shaft 202 about its axis to withdraw the threaded end from the socket 204 to release the gripper 120. The user instruction may be to attach to the gripper 120, and the controller 114 is operable to respond by operating motor 206 to rotate shaft 202 about its axis to thread the threaded end into the socket 204 to secure the controller 114 to the gripper 120. It will be appreciated that one or more action may be taken in concert with one or more other action and/or one or more action of the vehicle 110. For example, attaching to the gripper 120 may take place after the vehicle 110 navigates over to the gripper 120, which may optionally be automatic or manual.

The transmission assembly 170 is arranged to couple the round gears 174, 178 to the control coupler 162 (i.e., to the shaft 180) when the gripper 120 is mounted to the controller 114. The exemplary transmission assembly 170 is a geared transmission.

Referring now to FIGS. 4 to 11, the transmission assembly 170 includes a first worm wheel 222. The first worm wheel 222 is arranged to engage a first worm 224 of the shaft 180 when the shaft 180 is received in the socket 204, as shown in FIG. 6. The first worm wheel 222 is secured to a first shaft 226 extending towards the round gear 174. As illustrated in FIGS. 7A and 7B, the transmission assembly 170 includes a first bevel gear interface 230 between the first shaft 226 and a second shaft 232, and a second bevel gear interface 234 between the second shaft 232 and a third shaft 236.

As illustrated in FIG. 8, the third shaft 236 includes a second worm 240 meshed with a second worm wheel 242 joined by a fourth shaft 244 to the round gear 174. In some embodiments, as illustrated, the gripper 120 includes a parallel pair of round gears 174a, 174b, each joined by one of a pair of shafts 244a, 244b to a pair of second worm wheels 242a, 242b, each worm wheel 242a, 242b meshed with the second worm 240. A parallel pair provides improved performance (e.g., stability).

As illustrated in FIG. 9, the transmission assembly 170 also includes a fifth shaft 250. The input shaft 250 has a toothed face 252 and is arranged to mesh with a toothed face 254 of the output shaft 180 of the control coupler 162 when the control coupler 162 is mounted to the control coupler 162.

As illustrated in FIGS. 10A and 10B, the fifth shaft 250 also includes a third worm 260 to drive a third worm wheel 262. The third worm wheel 262 is secured to a shaft 264, and joined by the shaft 264 to the second round gear 178. In some embodiments, as illustrated, the gripper 120 includes a parallel pair of round gears 178a, 178b, joined by a pair of shafts 264a, 264b to a pair of third worm wheels 262a, 262b each meshed with the third worm 260.

As exemplified in FIGS. 4 and 5, in use, rotation of the output shaft 180 about a longitudinal axis 182 of the shaft 180 drives rotation of the round gears 174, 178. When the gripper 120 is open, as in FIG. 4, the round gear 174 is meshed with the toothed track 172 while the round gear 178 is not meshed with the toothed track 176. When the gripper 120 is open, rotation of the shaft 182 about the axis 182 draws the gripper 120 closed by pulling the track 172 via the round gear 174. Once the gripper 120 reaches an intermediate position, as illustrated in FIG. 5, the free end track 176 encounters the free end round gear 178, and the free end round gear 178 meshes with the free end track 176. From the intermediate position, as the shaft 180 continues to rotate about the axis 182, the round gears 174, 178 each pull the respective tracks 172, 176 to draw the gripper 120 closed.

Referring to FIGS. 10A and 10B, in some embodiments, the gripper 120 includes a lock 270. The lock 270 is operable to prevent the gripper 120 from moving from the closed configuration towards the open configuration when the lock is engaged. As exemplified, the lock 270 is engageable with the free end pinion 176. When engaged with the free end pinion 176, the lock 270 prevents the second grip member from moving towards the open position.

The lock 270 is biased into an engaged position (FIG. 10B). The lock 270 may include a spring hinge 272 to bias the lock into the engaged position. The lock 270 is disengaged by the control coupler 162 when the control coupler is joined with the gripper coupler 160. It will be appreciated that various ways of disengaging the lock 270 may be used. In some embodiments, the control coupler 162 mechanically disengages the lock 270 when the control coupler 162 is joined to the gripper coupler 160. As exemplified, when the shaft 180 is received in the socket 200 the shaft 180 bears against the lock 270 at a point across the spring hinge 272 from an engagement portion 274 of the lock 270, and thereby moves the engagement portion 274 out of engagement with the round gear 176.

In some embodiments, as illustrated, the lock 270 is a ratchet lock which, when engaged, prevents the gripper 120 from opening but allows the gripper 120 to close further. The exemplary lock 270 includes a ratchet arm 276 engaging the round gear 176 to restrict the direction of movement of the round gear 176. In the exemplary embodiment with a parallel pair of round gears 176a, 176b, the lock 270 includes a pair of ratchet arms 276a, 276b, a pair of spring hinges 272a, 272b, and a pair of engagement portions 274a, 274b.

Referring again to FIGS. 4 and 5, In some embodiments, the control coupler 162, motors 154, 184, 206, and counterweight 164 are parts of the controller 114 that is releasably securable to a main body 202 (FIG. 1) of the controller 114. As exemplified, the controller housing 282 contains the motors 154, 184, 206, and to which is secured the control coupler 162 and counterweight 164. It will be appreciated that the controller 114 may be provided separately from the vehicle 110 and/or the gripper 120.

Optionally, the installation apparatus 112 includes more than one gripper in parallel. In some embodiments, a second or further gripper is joined to the gripper 120 and/or the control coupler 162 to mechanically receive power therefrom to close a plurality of grip members of the second or further gripper around the environmental object to be gripped. It will be appreciated that a transmission assembly of the second or further gripper may be joined to the first gripper and/or control coupler 162 in various ways. As exemplified in FIGS. 4, 5, and 11, the shaft 180 includes a fourth worm 290. The transmission assembly of the second or further gripper may include a worm wheel 292 operable to engage the fourth worm 290 to be driven by the shaft 180 and thereby mechanically carry power to the second or further gripper (e.g., via shaft 294 secured to wheel 292). It will be appreciated that a second or further gripper gripping the environmental object provides a more secure grip, particularly when the object is a pole or other elongated object and the grippers grasp the object at different points along the object. It will also be appreciated that the installation apparatus may include only a single gripper.

Figure 12:
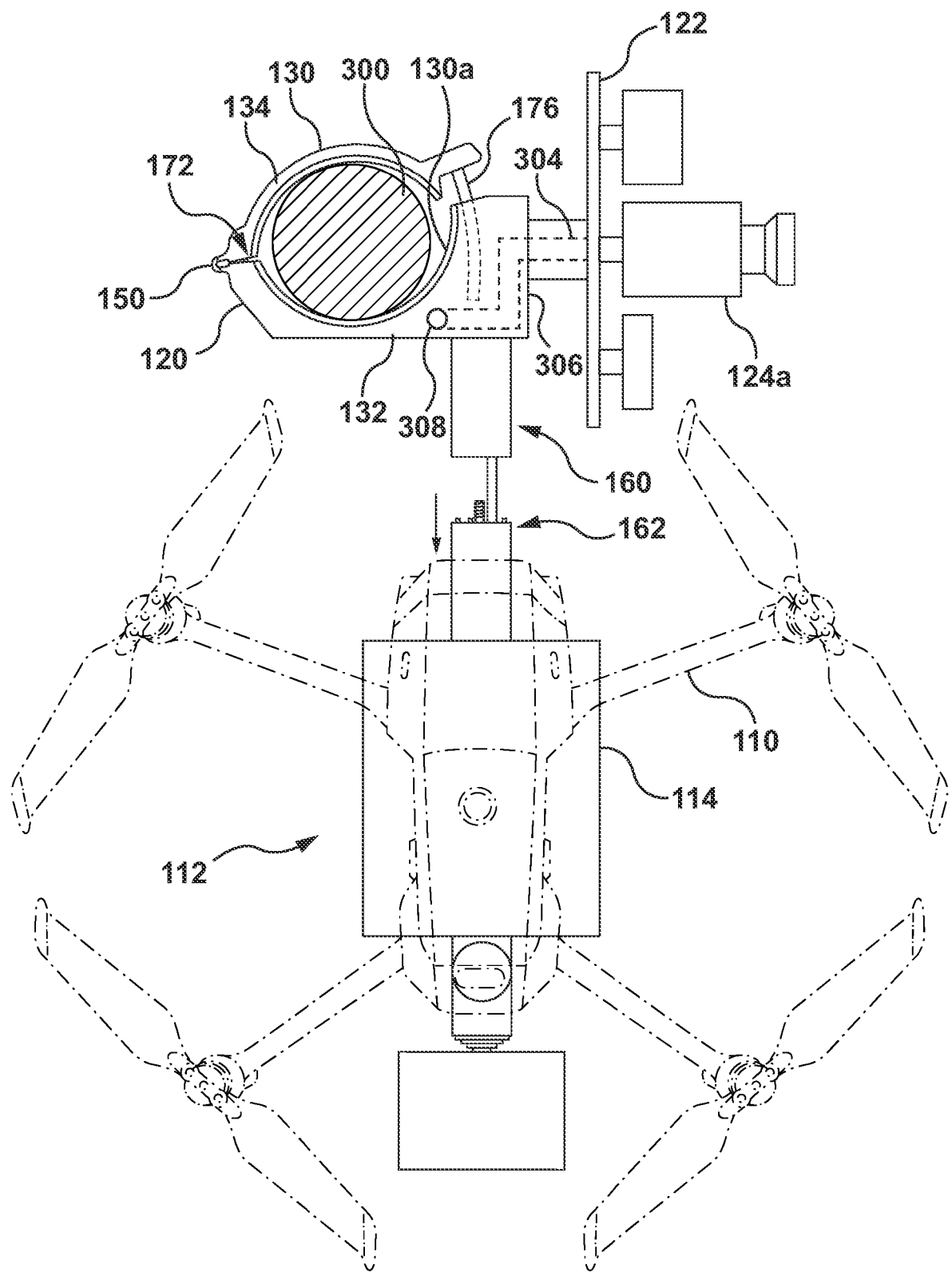
FIG. 12 is a top view of the installation apparatus of FIG. 1B with the gripper closed around a small environmental object.

Referring now to FIG. 12, it will be appreciated that the gripper 120 may be closed about environmental objects of various sizes. As illustrated, the toothed track 172 and/or the toothed track 176 may extend far enough to allow the corresponding round gear 174, 178 to pull the gripper 120 closed against objects of various sizes, including larger objects such as pole 128 and smaller objects such as pole 300.

In some embodiments, the gripper 120 includes an internal conduit 304 within a body 306 of the gripper 120 (e.g., within a body forming the first grip member 132). The conduit 304 is provided to carry wires. The conduit 304 extends from the mounting bracket 122 (e.g., an opening through the bracket 122 to a payload object, such as camera 124a) to an opening 308 near a gripping face 130a of a grip member 130. In use, in some embodiments, a gripper 120 is secured to an environmental object (e.g., a pole) near an electrical cabinet (e.g., on a utility pole), and one or more payload objects may be electrically coupled to the electrical cabinet via cables passing through the gripper 120.

Figure 13:
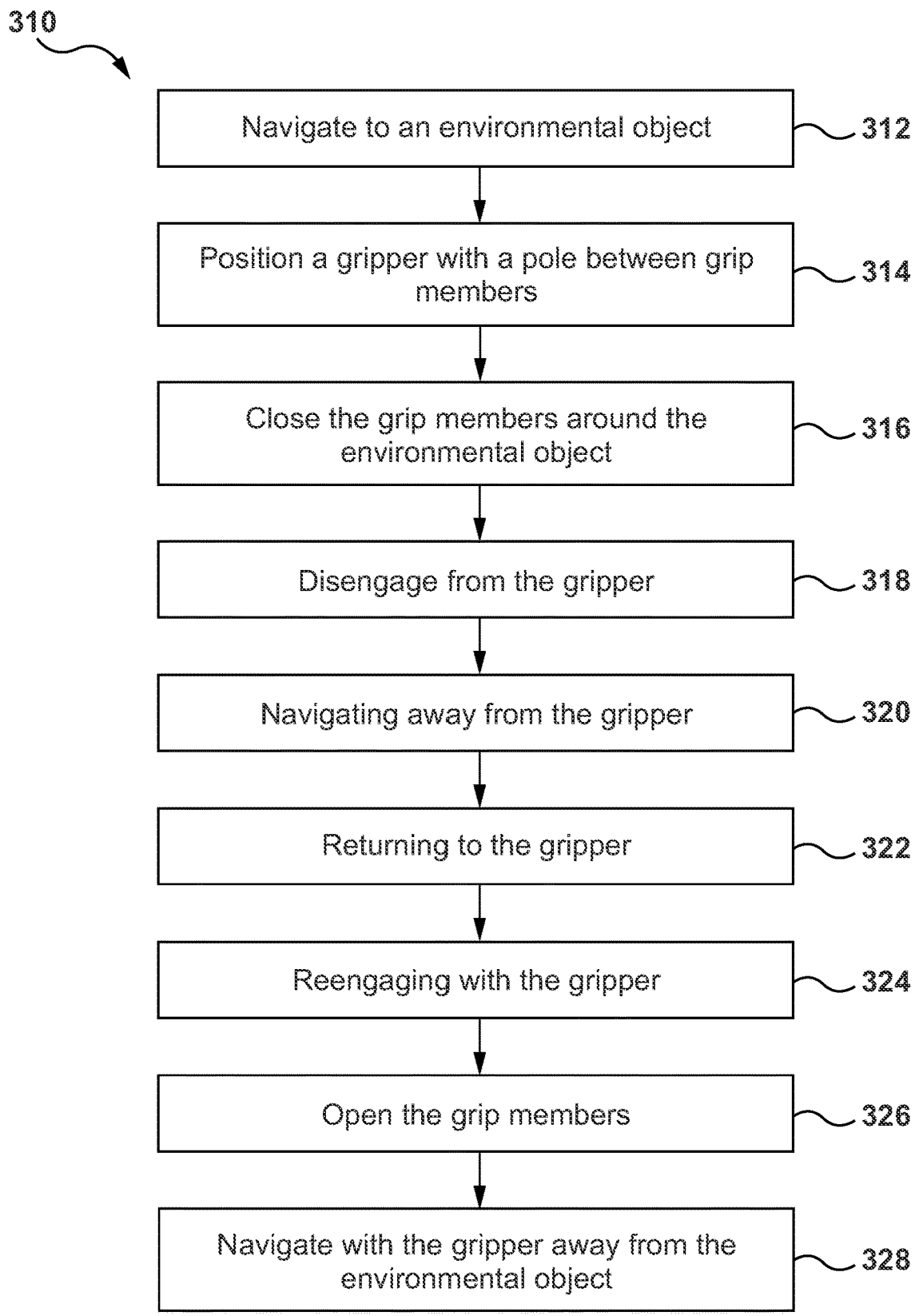
FIG. 13 is a flow chart of a method of operating a gripper, according to an embodiment.

Referring now to FIG. 13, illustrated is a method 310 of operating a gripper. Method 310 may be used to secure a payload (e.g., a camera) to the pole. Method 310 may be performed remotely from the pole using an unmanned vehicle, such as an unmanned aerial, aquatic, and/or land-based vehicle. An unmanned aerial vehicle may be used to access remote locations and/or raised objects, such as utility poles and the top ends of poles.

Method 310 includes, at step 312, remotely operating an unmanned vehicle 110 to navigate the unmanned vehicle to the pole 128. The gripper 120 is carried by the unmanned vehicle 110. At step 314, method 310 includes remotely operating the unmanned vehicle 110 to position the gripper 120 with the pole 128 received between first and second grip members 132, 134 of the gripper.

The method 310 includes, at step 316, remotely operating a controller 114 to mechanically engage a transmission assembly 170 of the gripper 120 and mechanically operate the transmission assembly to close the first and second grip members around the pole (i.e., against the pole), to grip the pole. At step 318, the controller 114 is remotely operated to disengage the controller 114 from the gripper. Disengaging from the gripper includes withdrawing a drive shaft of the controller 114 from the gripper. Withdrawing the drive shaft engages a lock of the gripper to lock the first and second grip members in position around the pole to secure the gripper to the pole. The method 300 also includes, at step 320, remotely operating the unmanned vehicle to navigate the unmanned vehicle away from the gripper.

In some embodiments, method 300 includes returning the vehicle 110 and reengaging the gripper 120. Method 300 may include, at step 322, remotely operating the unmanned vehicle to return to the gripper, and, at step 324, remotely operating the controller 114 to reengage the controller 114 with the gripper, whereby reengaging includes inserting the drive shaft of the controller 114 into the gripper and thereby disengaging the lock.

In some embodiments, following step 324, method 300 includes, at step 326, remotely operating the controller 114 to mechanically engage a transmission assembly of the gripper and mechanically operate the transmission assembly to open the first and second grip member from around the pole. At step 328 following step 326, method 300 includes remotely operating the unmanned vehicle to navigate the unmanned vehicle away from the pole with the gripper mounted to the unmanned vehicle via the controller 114.

While the above description provides examples of one or more apparatus, methods, or systems, it will be appreciated that other apparatus, methods, or systems may be within the scope of the claims as interpreted by one of skill in the art.

What is claimed is:

1. An apparatus for installing an object at a remote location, comprising:
   a) a controller configured to be mounted to an unmanned vehicle, the controller comprising a controller housing, at least one motor located in the controller housing, a communication module located in the controller housing for receiving user commands for operating the at least one motor, and a control coupler extending from the controller housing, the control coupler including a coupler housing, a drive shaft located within the coupler housing and a fastener located within the coupler housing adjacent the drive shaft, the at least one motor being operable to rotate the drive shaft about a longitudinal drive shaft axis and operable to actuate the fastener; and
   b) a gripper configured to be releasably coupled to the control coupler, the gripper comprising a first socket for receiving the drive shaft, a second socket for receiving the fastener to secure the gripper to the control coupler, and a transmission assembly positioned to be engaged by the drive shaft when the drive shaft is received in the first socket, the transmission assembly operable to be powered by a rotation of the drive shaft about the longitudinal axis of the drive shaft to move the gripper from an open configuration to a closed configuration, and a holder for holding the object;
   wherein the transmission assembly includes a free end toothed track mounted to a second end of a second grip member and a free end round gear mounted to a second end of a first grip member, the free end toothed track and the free end round gear being disengaged when the second grip member is in an open position, engaged when the second grip member is at an intermediate position between the open and closed positions and engaged when the second grip member is in the closed position, whereby the drive shaft is operable to turn the free end round gear and thereby move the free end toothed track to move the second grip member between the intermediate and closed positions;
   wherein the transmission assembly further includes a lock engageable with the free end round gear to prevent the second grip member from moving toward the open position, the lock being biased into an engaged position and disengaged when the drive shaft is engaged with the transmission assembly.

2. The apparatus of claim 1, wherein the unmanned vehicle is an unmanned aerial vehicle.

3. The apparatus of claim 1, wherein the gripper includes:
   a) a first grip member having a first end and a second end spaced from the first end;
   b) a second grip member having a first end and a second end spaced from the first end, the second grip member pivotally joined to the first grip member at a pivot joint and moveable about the pivot joint between an open position and a closed position, a spacing between the second ends being smaller in the closed position than in the open position; and
   c) the transmission assembly including a toothed track mounted to the second grip member spaced from the second end of the second grip member, and a round gear mounted to the first grip member spaced from the second end of the first grip member, the round gear meshed with the toothed track whereby the drive assembly of the drive apparatus is operable to mechanically drive the round gear and thereby move the toothed track to move the second grip member between the open and closed positions.

4. The apparatus of claim 1, wherein the fastener is a threaded fastener and the second socket is a threaded socket, and the at least one motor is operable to rotate the threaded fastener about a longitudinal fastener axis.

5. A gripper to be carried by a controller, the gripper comprising:
   a) a first grip member having a first end and a second end spaced from the first end;
   b) a second grip member having a first end and a second end spaced from the first end, the second grip member pivotally joined to the first grip member at a pivot joint and moveable about the pivot joint between an open position and a closed position, a spacing between the second ends being smaller in the closed position than in the open position;

c) a gripper coupler secured to the first and second grip members and operable to engage a control coupler of the controller to releasably mount the gripper to the controller; and d) a transmission assembly, the transmission assembly including a toothed track mounted to the second grip member spaced from the second end of the second grip member, and a round gear mounted to the first grip member spaced from the second end of the first grip member, the round gear meshed with the toothed track and the transmission assembly positioned to be mechanically engaged by the control coupler when the gripper coupler is engaged with the control coupler whereby the control coupler is operable to mechanically drive the round gear and thereby move the toothed track to move the second grip member between the open and closed positions;

wherein the transmission assembly further includes a free end toothed track mounted to the second end of the second grip member and a free end round gear mounted to the second end of the first grip member, the free end toothed track and the free end round gear are disengaged when the second grip member is in the open position, engaged when the second grip member is at an intermediate position between the open and closed positions and engaged when the second grip member is in the closed position; wherein the free end round gear is mechanically coupled to the control coupler when the gripper coupler is engaged with the control coupler, whereby the control coupler is operable to turn the free end round gear and thereby move the free end toothed track to move the second grip member between the intermediate and closed positions;

wherein each of the toothed tracks is an arcuate rack; and wherein the transmission assembly further includes a lock engageable with the free end round gear to prevent the second grip member from moving toward the open position, the lock being biased into an engaged position and disengaged by the control coupler when the gripper coupler is engaged with the control coupler.

6. The gripper of claim 5, further comprising a mounting bracket to support a payload, the mounting bracket secured to the first and second grip members.

7. The gripper of claim 5, wherein the toothed track is an arcuate rack.

8. The gripper of claim 5, wherein the gripper coupler includes a socket to receive a drive shaft of the control coupler, the drive shaft rotatable about a longitudinal axis of the drive shaft to mechanically move the transmission assembly.

9. The gripper of claim 5, wherein the gripper coupler also includes a threaded opening for receiving a threaded fastener of the control coupler to secure the gripper to the controller.

10. A gripper moveable between an open configuration and a closed configuration, the gripper including:

a) a gripper coupler operable to engage a control coupler of a controller to mount the gripper to the controller with a drive shaft of the control coupler received in a first socket of the gripper coupler; and b) a transmission assembly positioned to be engaged by the drive shaft when the drive shaft is received in the first socket, the transmission assembly operable to be powered by a rotation of the drive shaft about a longitudinal axis of the drive shaft to move the gripper from the open configuration to the closed configuration;

wherein the transmission assembly also includes a free end toothed track mounted to the second end of the second grip member and a free end round gear mounted to the second end of the first grip member, the free end toothed track and the free end round gear are disengaged when the second grip member is in the open position, engaged when the second grip member is at an intermediate position between the open and closed positions and engaged when the second grip member is in the closed position;

wherein the free end round gear is mechanically coupled to the control coupler when the gripper coupler is engaged with the control coupler, whereby the control coupler is operable to turn the free end round gear and thereby move the free end toothed track to move the second grip member between the intermediate and closed positions.

11. The gripper of claim 10, wherein the transmission assembly includes a lock engageable to prevent the gripper from moving from the closed configuration to the open configuration, wherein the lock is biased into an engaged position and is disengaged by the control coupler when the gripper coupler is engaged with the control coupler.

12. The gripper of claim 11, wherein the lock is disengaged by the drive shaft when the drive shaft is received in the first socket.

13. A method of operating a gripper, comprising:

a) remotely operating an unmanned vehicle to navigate a robotic vehicle to a pole, the unmanned vehicle carrying a controller to which the gripper is removably mounted;

b) remotely operating the unmanned vehicle to position the gripper with the pole received between first and second grip members of the gripper;

c) remotely operating the controller to mechanically engage a transmission assembly of the gripper and mechanically operate the transmission assembly to close the first and second grip members around the pole, the transmission assembly further includes a lock engageable with a free end round gear to prevent the second grip member from moving toward the open position, the lock being biased into an engaged position and disengaged when a drive shaft is engaged with the transmission assembly;

d) remotely operating the controller to dismount the gripper from the controller, whereby dismounting includes withdrawing the drive shaft of the controller from the gripper thereby engaging the lock of the gripper to lock the first and second grip members in position around the pole to secure the gripper to the pole; and e) remotely operating the unmanned vehicle to navigate the unmanned vehicle away from the gripper with the controller secured to the vehicle.

14. The method of claim 13, further comprising:

a) remotely operating the unmanned vehicle to return to the gripper; and b) remotely operating the controller to remount the gripper to the controller, whereby remounting includes inserting the drive shaft of the controller into the gripper and thereby disengaging the lock.

15. The method of claim 14, further comprising:

a) remotely operating the controller to mechanically engage the transmission assembly of the gripper and mechanically operate the transmission assembly to open the first and second grip member from around the pole; and b) remotely operating the unmanned vehicle to navigate the unmanned vehicle away from the pole with the gripper mounted to the drive apparatus and the controller secured to the vehicle.

\* \* \* \* \*